(12) United States Patent
Kang

(10) Patent No.: US 10,563,986 B2
(45) Date of Patent: Feb. 18, 2020

(54) CLADDING-PUMPED WAVEGUIDE OPTICAL GYROSCOPE

(71) Applicant: LGS Innovations LLC, Herndon, VA (US)

(72) Inventor: Inuk Kang, Holmdel, NJ (US)

(73) Assignee: LGS Innovations LLC, Herndon, VA (US)

( * ) Notice: Subject to any disclaimer, the term of this patent is extended or adjusted under 35 U.S.C. 154(b) by 549 days.

(21) Appl. No.: 15/408,074

(22) Filed: Jan. 17, 2017

(65) Prior Publication Data

US 2018/0364044 A1    Dec. 20, 2018

Related U.S. Application Data

(60) Provisional application No. 62/398,255, filed on Sep. 22, 2016.

(51) Int. Cl.
| | |
|---|---|
| *G01C 19/72* | (2006.01) |
| *G02F 1/35* | (2006.01) |
| *H01S 3/067* | (2006.01) |
| *H01S 3/094* | (2006.01) |
| *H01S 3/063* | (2006.01) |
| *H01S 3/083* | (2006.01) |
| *H01S 3/0941* | (2006.01) |
| *H01S 3/10* | (2006.01) |
| *H01S 3/02* | (2006.01) |

(52) U.S. Cl.
CPC ......... *G01C 19/721* (2013.01); *G02F 1/3519* (2013.01); *H01S 3/0637* (2013.01); *H01S 3/06791* (2013.01); *H01S 3/06795* (2013.01); *H01S 3/083* (2013.01); *H01S 3/094007* (2013.01); *H01S 3/025* (2013.01); *H01S 3/0941* (2013.01); *H01S 3/10084* (2013.01)

(58) Field of Classification Search
CPC ..... G01C 19/721; G02F 1/295; G02F 1/3519; H01S 3/06791; H01S 3/00; H01S 3/11; H01S 3/025; H01S 3/06795; H01S 3/094007; G02B 6/26; H04B 10/04; H04B 10/291
See application file for complete search history.

(56) References Cited

U.S. PATENT DOCUMENTS

| | | | |
|---|---|---|---|
| 5,106,193 A | | 4/1992 | Fesler et al. |
| 5,657,153 A | * | 8/1997 | Endriz ................. H04B 10/291 359/333 |

(Continued)

OTHER PUBLICATIONS

Chao-Xiang Shi; Rotation Measurement With the Use of a Pulsed Er-Doped Fiber Laser With Integrated Optic Circuit: Proposal, Simple Theory, and Experiment; Microwave and Optical Technology Letters; vol. 15, No. 5, Aug. 5, 1997; p. 311-315.

*Primary Examiner* — Jamil Ahmed
(74) *Attorney, Agent, or Firm* — Baker & Hostetler LLP

(57) ABSTRACT

A waveguide optical gyroscope (WOG) is disclosed. One WOG may comprise an amplified spontaneous emission (ASE) source, a sensor comprising a waveguide loop disposed in a first cladding material interposed between layers of at least a second cladding material having an index of refraction lower than an index of refraction of the first cladding material, wherein the sensor is configured to receive an output signal of the ASE source, and a pump source configured to pump the first cladding material with an in-plane pump signal.

18 Claims, 3 Drawing Sheets

(56) References Cited

U.S. PATENT DOCUMENTS

| | | | |
|---|---|---|---|
| 6,377,391 B1 | 4/2002 | Vakoc et al. | |
| 6,483,628 B1 * | 11/2002 | Digonnet | H01S 3/06795 |
| | | | 359/333 |
| 6,567,432 B1 | 5/2003 | Kim et al. | |
| 6,584,241 B2 | 6/2003 | Davis et al. | |
| 2002/0097943 A1 * | 7/2002 | Davis | G02F 1/3519 |
| | | | 385/5 |
| 2010/0189140 A1 * | 7/2010 | Nettleton | H01S 3/025 |
| | | | 372/10 |
| 2015/0131102 A1 | 5/2015 | Guattari et al. | |

* cited by examiner

CLADDING-PUMPED WAVEGUIDE OPTICAL GYROSCOPE

RELATED APPLICATION

The present application claims priority to and the benefit of U.S. Application No. 62/398,255, "CLADDING-PUMPED WAVEGUIDE OPTICAL GYROSCOPE" (filed Sep. 22, 2016), the entirety of which application is incorporated herein by reference for any and all purposes.

FIELD

This application is generally related to inertial navigation devices including optical gyroscopes.

BACKGROUND

Optical gyroscopes are important for inertial navigation. Optical gyroscopes are expected to play more important roles for applications where GPS is denied or compromised.

The Sagnac effect is directly related to optical gyroscopes. According to the Sagnac effect, the phase or frequency of light circulating in a loop geometry is modified by the rotation of the loop. The effect is manifested by a change in interference between the two counter propagating lights in the loop.

Optical gyroscopes can be broadly categorized into the interferometric type where the phase shift is measured, and the resonant type where a frequency shift due to rotation is measured. In both cases, the sensitivity of the gyroscope is linearly proportional to the length of the loop.

Chip-scale optical gyroscopes have been advanced to reduce the size of the device to adopt optical gyroscope technologies to other application areas. However, the optical propagation loss of typical waveguides is greater than 1 dB/m. This is several orders of magnitude inferior to optical fiber loss of about 0.2 dB/km. As a result, the loop length, and in turn the sensitivity, of the waveguide optical gyroscope is limited.

SUMMARY

The foregoing needs are met, to a great extent, by a waveguide optical gyroscope (WOG) utilizing a rare-earth doped waveguide core and cladding pumping. In so doing, a loss-free and symmetric gyroscope loop is obtained.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1:
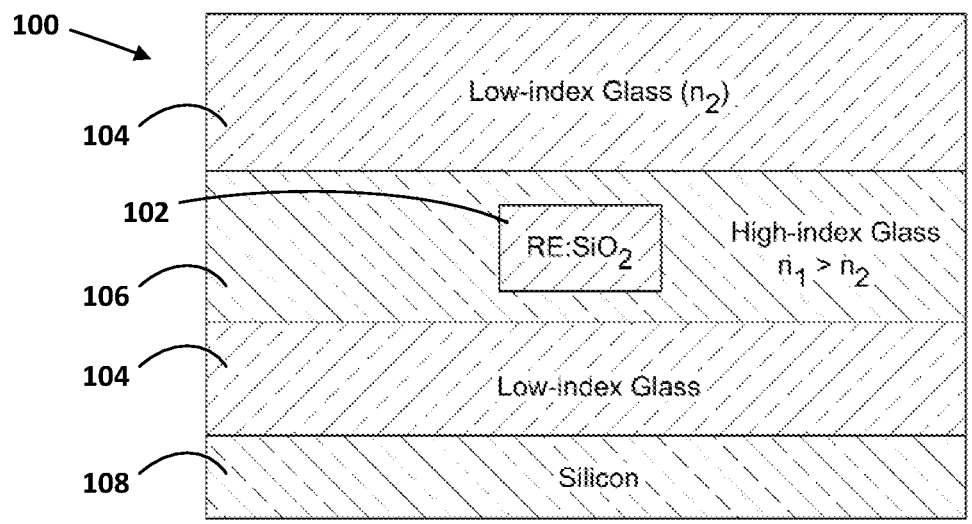
FIG. 1 illustrates a cross-sectional view of a waveguide layer of a WOG according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

In one aspect of the application, interferometric waveguide optical gyroscope (I-WOG) sensors are described. The I-WOG sensors may be useful for munitions navigation in the absence of GPS. One feature of the I-WOG sensors is a three dimensional (3-D) integrated Sagnac interferometer implemented with a rare-earth (RE)-doped silica waveguide on silicon. The RE-doped waveguide is illuminated by an athermal pump laser. The pump laser light is guided in and through the cladding layer to provide compensation for the loss of the signal guide by the waveguide core. The light enables an optical path longer than 120 m necessary for achieving navigation-grade inertial guidance. A similar RE-doped waveguide structure, with pump laser light directly injected to the waveguide core provides a signal input with wavelength stability better than 1 ppm. This helps obtain the scale factor stability under a severe operating environment.

A WOG has no moving parts and therefore possesses distinct advantages over MEMS-based inertial sensors in providing capability for operating through the harsh shock and vibration stresses expected during launch conditions. Silica PLCs have excellent mechanical properties comparable to silicon-based electronics historically shown to be survivable up to 50,000 g. Accordingly it is envisaged that a waveguide implementation of an interferometric FOG can produce a navigation-grade sensor. The techniques compensate for the low loss of 2-3 dB/m by weakly pumping active RE-doped waveguides to achieve completely lossless propagation. This can also provide overall signal gain. The doped waveguide also provides means for implementing an on-chip light source with much reduced environmental sensitivity.

According to another aspect of the application, hybrid integration using a silica planar lightwave circuit (PLC) on silicon is provided for integrating the necessary optical components on chip. This includes a micro-optic isolator and phase modulators with sufficient mechanical strength and low insertion losses.

WOG

FIG. 1 illustrates a waveguide optical gyroscope (WOG) 100 in accordance with aspects of the present disclosure. The WOG 100 may comprise a waveguide 102 (e.g., rare-earth (RE) doped waveguide) and dual clad layers 104 and 106. The inner clad layer 106 may be pumped using cladding pumping, as described herein. As an example, the WOG 100 may be configured as a loss-free loop, such as a loss compensated loop. As shown, the waveguide 102 may be embedded in a high-index ($n_1$) cladding 106 that is sandwiched between lower-index ($n_2 < n_1$) cladding layers 104. The WOG 100 may further comprise a silicon substrate 108. As such, a pump light 200 (e.g., laser) may irradiate in the plane of the high-index cladding layer 106 and the irradiated energy may pump the waveguide 102, as shown in FIG. 2.

Figure 2:
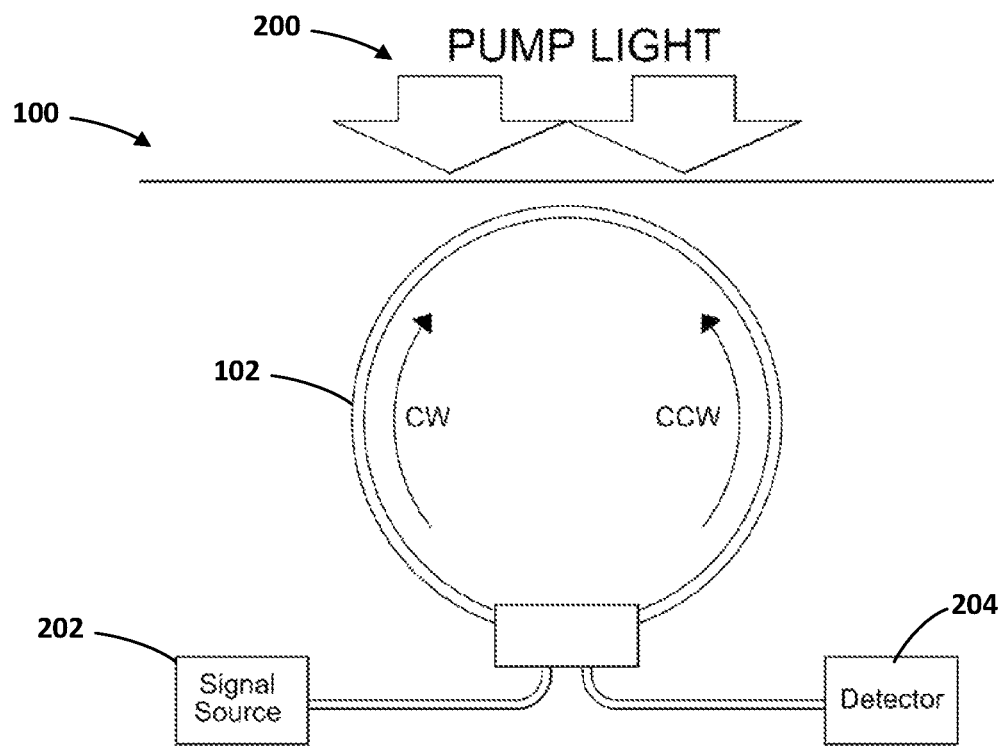
FIG. 2 illustrates a configuration of a cladding-pumped WOG according to an aspect of the application.

As shown in FIG. 2, the waveguide 102 may be configured in a loop configuration and coupled to one or more of a signal source 202 (e.g., ASE source) and a detector 204 (e.g., photodetector). It is to be understood that the pump light 200 may be propagated in a manner such that the reciprocity of the clockwise (CW) and counter-clockwise (CCW) rotation of a signal beam received from the signal source 202 is not violated. The sensitivity of the WOG 100 may be dependent on the symmetry between the CW and CCW propagation in the loop configuration of the waveguide 100. Near uniform illumination of the waveguide 100 by the cladding pumping facilitates nominal to no longitudinal gain/loss variation along the waveguide 100 and maintains the symmetry between the CW and CCW propagation.

Figure 3:
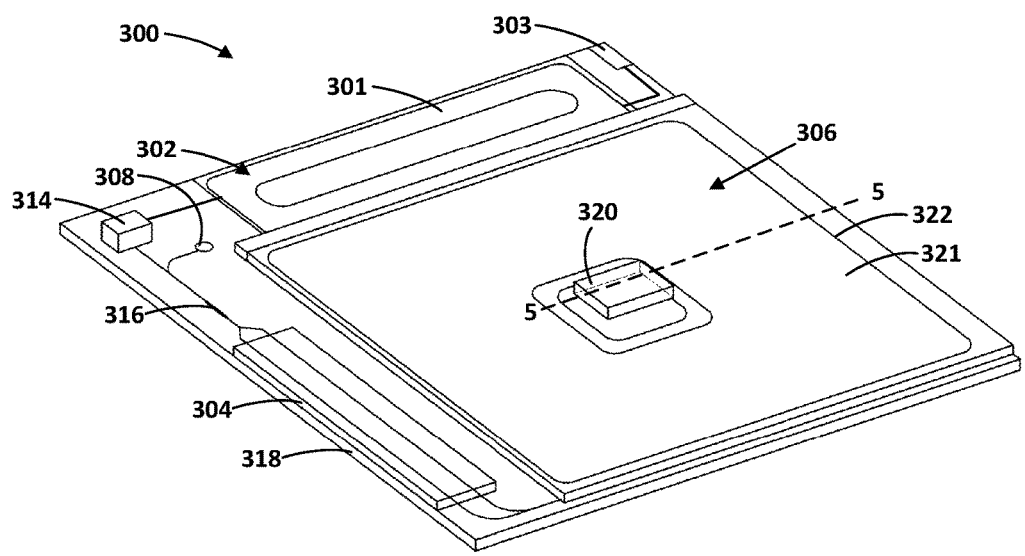
FIG. 3 illustrates a WOG according to an aspect of the application.

FIG. 3 illustrates an interferometric waveguide optical gyroscope (I-WOG) 300 in accordance with aspects of the present disclosure. The I-WOG 300 may include an amplified spontaneous emission (ASE) source 302, one or more phase modulators 304 (e.g., for biasing), a Sagnac interferometer 306 or sensor, and a photodetector 308. Other components may be included and configured in various manners such as isolators and polarizers, for example. As an example, the I-WOG 300 may be configured as a loss-compensated Sagnac sensor using cladding-pumped RE-doped waveguide is described. As a further example, one or more components of the I-WOG 300 may be disposed on a planar lightwave circuit (PLC) such as hybrid-integrated on a silica PLC 318

The ASE source 302 may include a waveguide 301 and a pump source 303 configured to energize the waveguide 301. The pump source 303 of the ASE source 302 may be or comprise an athermal pump laser. The waveguide 301 may comprise a rare-earth (RE) doped silica.

The Sagnac interferometer 306 (e.g., sensor) may include a waveguide loop 321 disposed in a first cladding material interposed between layers of at least a second cladding material having an index of refraction lower than an index of refraction of the first cladding material. As an example, the waveguide loop 321 comprises a rare-earth (RE) doped silica. The Sagnac interferometer 306 may be configured to receive an output signal of the ASE source 302. As an example, the output of the ASE source 302 may pass through one or more of a micro-optic isolator 314, a thin-film optical filter (not shown) a micro-optic polarizer 316, and the phase modulators 304 before guided into the Sagnac interferometer 306. A pump source 320 may be configured to pump at least the first cladding material of the Sagnac interferometer 306 with an in-plane pump signal. As such, the propagation loss in the Sagnac interferometer 306 may be compensated by the pump source 320. The pump source 320 may be or comprise an athermal pump laser. In certain aspects, the Sagnac interferometer 306 may include a trench 322 formed along a transverse axis of the multilayers of cladding material and spaced from the pump source 320 such that the waveguide loop is disposed between the pump source and the trench 322. A reflective coating, such as metal, may be disposed in the trench 322 to reflect the pump light back into the cladding layer, effectively confining the pump light. Pump rays may be fully absorbed by the RE-doped waveguide core, while they traverse the waveguide loop that is optically confined by the reflective side walls surrounding 321.

As an illustrative example, the ASE source 302 may include an athermal pump laser 310 and a ~2-m long RE-doped waveguide 312. A micro-optic isolator 314 and thin-film optical filter may be configured to lock the ASE wavelength. A high polarization extinction (>40 dB) micro-optic polarizer 316 may be configured to control the polarization before transmitting the light into the Sagnac interferometer 306. For phase modulation, an approximate 1.5 cm X-cut lithium niobate phase modulators 304 may be hybrid-integrated to the silica PLC 318. The Sagnac interferometer 306 may include active loops of multi-layer waveguides pumped by two pumps 320 (e.g., 980-nm pump signals), facing in opposite directions, located at/near the center of the active loop. The outer and inner perimeters of the loops may be surrounded by trenches 322 configured with metal coating to operate as reflectors and thereby serving to confine the pump beam to improve the pump efficiency. A COTS InGaAs photodetector 308 (~10 MHz bandwidth) is hybrid-integrated for detecting the gyro signal.

Figure 4:
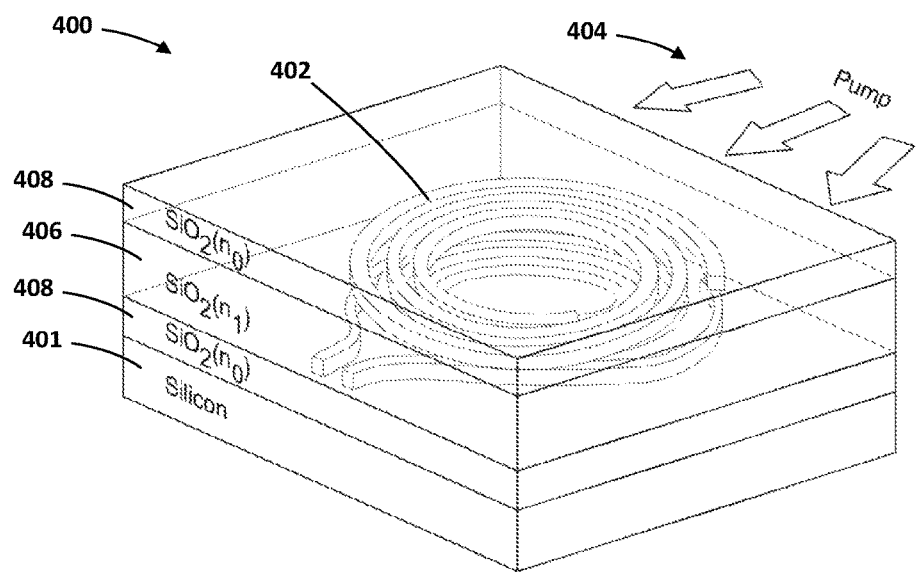
FIG. 4 illustrates a multi-layer Sagnac loop with cladding pumping according to an aspect of the application.

As provided in the exemplary embodiment as illustrated in FIG. 4, a three dimensional (3-D) integrated waveguide 402 may be configured a fiber loop in an interferometric fiber-optic gyroscope (I-FOG) 400. The I-FOG 400 of FIG. 4 may be configured as the Sagnac interferometer 306 of FIG. 3. The I-FOG 400 may be configured with extremely low propagation loss (e.g., 0.2 dB/km) of silica fiber at or near 1550 nm. It is envisaged in this application that achieving chip-scale long optical delays may leverage a low-loss (2 dB/m) silica waveguide (e.g., waveguide 402) disposed on silicon (e.g., with index contrast ~1.5-2%). A tight bend radius (e.g., about 1-2 mm) of the waveguide loop 403 and small confined mode size (~5 μm) facilitates high density packing of waveguides with negligible (−60 to −70 dB) overlap between the modes of neighboring waveguides (15-20 μm spacing). As an example, up to a 30-min delay is implemented in a single waveguide layer. Waveguide loss may be overcome by doping the waveguide 402 with Er or Er/Yb and pumping the waveguide 402 with ~980-nm pump light.

In reverence the FIG. 4, a pump beam 404 may be side-coupled and uniformly distributed in a cladding 406 surrounding at least a portion of the waveguide 402 interposed between cladding layers 408 configured to maintain the symmetry of the waveguide 402. Minimizing the background loss of the waveguide 402 may facilitate reduction of the pump power required to compensate for the waveguide loss. As an example, RE-doped waveguides may exhibit background loss lower than 3 dB/m. It is calculated that about 60 mW of 980 nm pump light (e.g., pump beam 404) may be absorbed in 120 m of an Er-doped (Er concentration ~$10^{25}/m^3$) waveguide to generate sufficient optical gain for compensating the background waveguide loss. The pump beam 404 may be sourced from 980-nm pump lasers operated athermally over the entire relevant temperature range by hybrid integrating the laser and an athermal micro-optic volume-grating wavelength locker ($\Delta\lambda=0.01$ nm/° C.) onto a silica PLC.

3D Photonic Integration

In another embodiment, the waveguide 402 may comprise a multi-stack design to implement Sagnac sensors having multiple waveguide layers. Such a configuration multiplies the length of the delay to longer than 120 m in order to achieve a shot-noise limited bias stability of less than 0.01 degree/hr. The multi-layer design may have no waveguide crossings which could contribute to detrimental back reflection and excess loss, nor in-plane or inter-plane modal overlap creating cross talk, except at the inter-layer transition region. The mode size may be expanded from ~5 µm to larger than 10 µm only locally in the transition area using a mode-size expander (FIG. 5), for example. This controlled transition between the layers without waveguide/mode crossings will be utilized to optimize the loop-winding geometry to minimize the impact of non-reciprocal perturbations.

The waveguide 402 in the Sagnac loop may include a RE-doped silica waveguide core ($\Delta n\sim2.5\%$) and may be surrounded by cladding ($\Delta n\sim0.5\%$) layers 406, 408 for guiding the pump light 404. The refractive indices are measured relative to that of the cladding layer 408 (e.g., buffer glass layer ($n_0$)) between the cladding 406 and a silicon substrate 401. The index of refraction of the waveguide 402 may be controlled from about 0.5% up to 4% by adjusting the concentration of glass ingredients, such as P and Ge, as well as the active ions such as Er and Yb. The waveguide 402 spacing (~15 µm) is sufficiently larger than the optical mode size such that unwanted power cross talks between the neighboring waveguides will be negligible Athermal RE-Doped Waveguide Light Source One of the challenges in I-FOGs is scale-factor stability. This may be compounded in harsh environments due to extreme temperature cycling, shock and vibration. In view of this, the RE-doped waveguide technology and hybrid-integrated athermal 980-nm pump laser described in this disclosure generates amplified spontaneous emission (ASE) from the doped waveguide. For efficient ASE generation, pump light is injected into the core of the doped waveguide. The mode expander on the doped waveguide side and active alignment in flip-chip bonding of the athermal pump laser will minimize the insertion loss. A thin-film optical filter whose passband (1540-1560 nm) overlaps with the spectrally flat part of ASE from Er ions will be integrated in the micro-optic isolator package, which will be flip-chip bonded to the silica PLC. Optimizing the thin-film optical filter helps achieve the required wavelength band and temperature stability.

According to another embodiment, a hybrid integration process similar to that used for the cladding pumps may be used to integrate an athermal pump laser to core-pump a ~2 m doped, tightly coiled, doped waveguide. A micro-optic isolator package (~2 mm size) includes a double-stage isolator (40-dB isolation) and collimating lens coated with optical bandpass filter (1540-1560 nm) to stabilize the central wavelength of the ASE irrespective of the temperature. Approximately 4-mW ASE generation per polarization within the band is expected using about 250 mW electrical power. Insertion loss of the isolator is minimized by using waveguide spot-size converter on the silica PLC.

Cladding-Pumping with Athermal Pump Lasers

Figure 5:
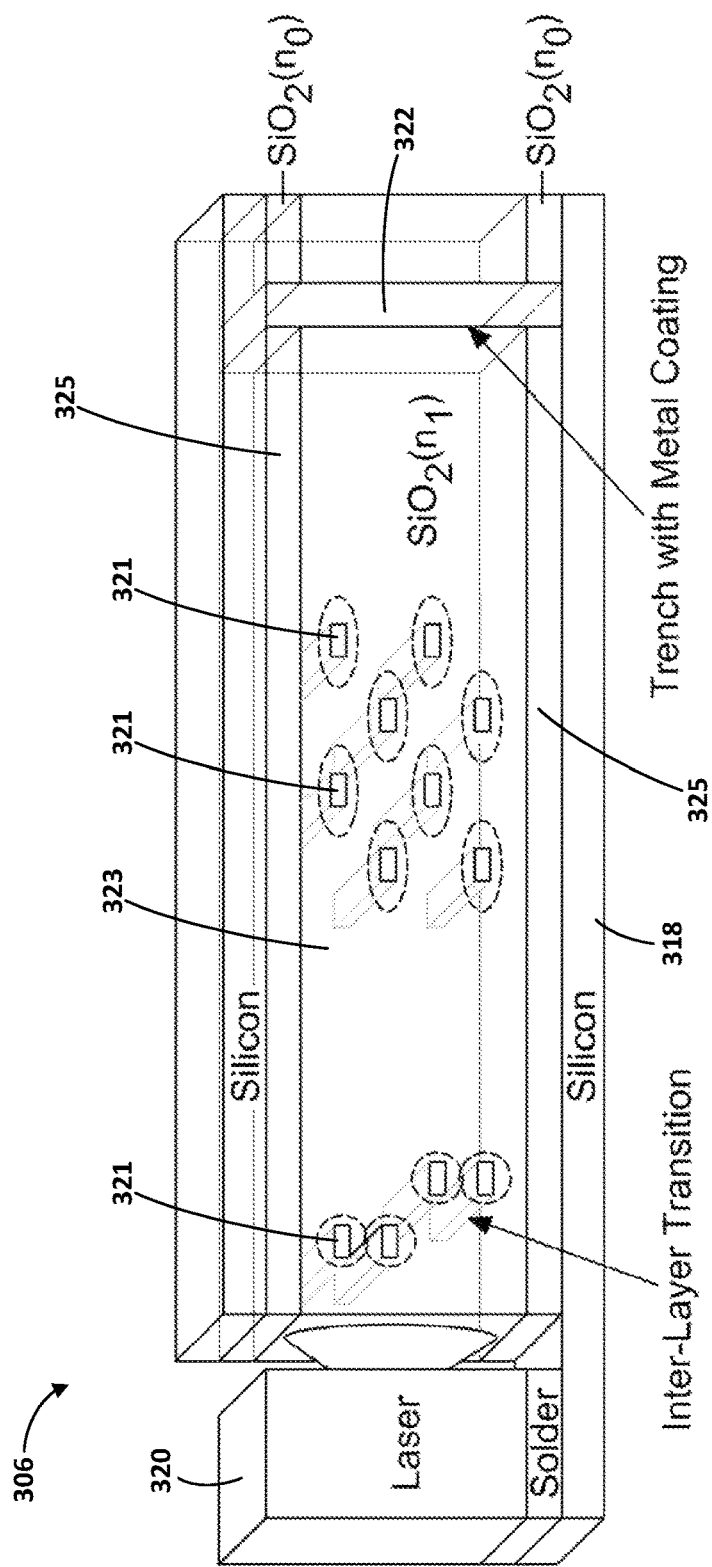
FIG. 5 illustrates a cross-sectional view of the cladding pumped waveguide loop along a dashed line of FIG. 3.

According to another aspect of the application, a cladding pumping scheme may be used to achieve uniform population inversion along the doped waveguide cores. The Sagnac interferometer 306 (e.g., sensor) is illustrated in FIG. 5, which may be a representation of a cross section taken across line 5-5 in FIG. 3. As shown in FIG. 5, Sagnac interferometer 306 the may include the waveguide loop 321 disposed in a first cladding material 323 interposed between layers of at least a second cladding material 325 having an index of refraction lower than an index of refraction of the first cladding material 323. As an example, the waveguide loop 321 comprises a rare-earth (RE) doped silica, which may maintain the reciprocity of the loop. Efficient pump geometry is may be used to achieve power consumption management. First, the light from the athermal pump source 320 may be coupled to the cladding layers, 323. Vertical alignment may be achieved by flip-chip bonding of the athermal pump source 320 on solder stacks whose thickness is precisely controlled by deposition.

The numerical aperture (NA) of the pump light of the pump source 320 may be controlled such that the pump light is vertically guided in the cladding layer 323. Second, the pump source 320 may operate athermally with the output wavelength varying less than 1 nm around the Er/Yb absorption peak over 100° C. temperature swings. The perimeter of the doped Sagnac loop area may form a cavity or trench 322 to trap the pump light. The trench 322 may comprise a metallic mirror coating to form a vertical reflecting surface around the waveguide loop 321. The shape of the trench 322 may be configured to promote chaotic pump propagation and even distribution of the pump light throughout the Sagnac loop. To uniformly excite all RE-doped waveguide cores, the trajectory of the pump rays in 306, as viewed from above in FIG. 3, is advantageous to be chaotic so that it ergodically covers the loop area. One problem of tracing rays confined in a reflective two dimensional cavity, formed by the reflective trench walls, may be similar to the problem of dynamical billiards in Newtonian mechanics. It is understood in the art that certain geometry, such as a racetrack, promotes chaotic trajectory. Two pump sources 320 may be used for symmetric illumination of the area. With ideal coupling (~1 dB coupling loss) and negligible potential pump leakage via scattering at the core waveguide walls, or losses at the mirror surfaces, about 80 mW pump power is needed to fully compensate for 2 dB/m passive propagation loss. Assuming about 40% wall plug efficiency of COTS pump lasers, 200 mW electrical power is needed. Any reduction in passive waveguide loss results in commensurate reduction in the pump power requirement.

Hybrid Integration

According to another aspect of the application, the maturity of silica PLC provides versatile tools for engineering ruggedized athermal I-WOG devices. For example, the symmetry of the power splitting of a Y-branch or directional coupler can be much more accurately controlled in silica PLC than in other platforms such as lithium niobate or III-V materials. In addition, mode size engineering can be reliably achieved with negligible excess loss, which in turn allows facile integration of various micro-optic components, such as isolators and polarizers, whose performance far exceed what can be achieved with waveguide equivalents. Various bonding methods, including solder bonds and hardened epoxy, can be used to achieve ruggedized integration of optical components having performance optimized for the task. In addition, local substitution in the over-clad materials, using polymer or other glasses, can achieve athermal performance in optical delay or power splitting ratio in the couplers.

In an embodiment, similar mode expanders also facilitate hybrid integration of the remaining components including the micro-optic polarizer and an array of X-cut lithium niobate (LN) modulators. Again, these components will be solidly bonded to the silica PLC using solder stacks similar to those used for integrating the pump lasers. It is envisaged that while the power split ratio of a silica Y-branch is quite symmetric and nearly independent of the temperature, the hybrid integration of lithium niobate modulators may introduce asymmetry. This can be addressed by various trimming techniques such as controlled scoring of the silica waveguide cladding.

LN modulators are subject to phase drift/noise from pyro- and piezo-electric effects. Good modulator design such as the X-cut geometry with buffer and shielding layers can significantly reduce the pyroelectric effect to <1 mrad/° C. The pyroelectric phase variation can be calculated using a temperature monitor or compensated by fast bias adjustments using signal processing, such as the four-phase modulation technique. It is expected the effect of the pyroelectric drift of the LN modulator will be manageable and should not seriously degrade the performance of the gyro. Piezoelectric phase variations are more difficult to cope with owing to potentially high-frequency vibration. experience in modeling the effects of vibration on electronic components in high-shock environments, which will be used for estimating and mitigating the piezoelectric effects.

High-Bandwidth Gyroscope Operation

Inertial guidance of projectile or UAV that may be subject to rapid rotation may require additional high-bandwidth control; maintaining 1-ppm scale factor stability/linearity over the wide dynamic range up to ±100,000°/sec in the case of guided munition is extremely challenging. The scale factor stability is directly related to the stability of the key system elements, specifically the loop area, the source center wavelength, and the modulator's V. The loop area will vary with temperature, but it can be calibrated out by directly measuring the loop temperature. Excessive stress on the coil due to centripetal forces may cause small deformations in the shape if not adequately managed in the mechanical design. The source wavelength stability will be derived from a thin film optical filter properly packaged so as to ensure negligible rotation relative to the waveguide. In addition, the ASE source must be very stable to minimize any spectral power variation over the passband of the filter. Achieving this stability requires a stable pump laser with stable coupling into the waveguide.

Achieving both the required sensitivity and supporting ±100,000°/sec axial rotation also means that the gyro must operate over multiple fringes. One option is to directly count the fringes either in open- or closed-loop mode. Alternately, a lower resolution gyro, or even the accelerometers, could be used to evaluate which fringe the high resolution gyro is operating on. Closed loop operation will be used for tip and tilt monitoring during and after the launch. However, careful analysis is required to determine an optimal mode of operation for the axial rotation during the launch, given the system constraints.

In an embodiment, a SWAP per axis is: (i) Volume/Weight: ~0.5 cm$^3$/~1 g; (ii) Power consumption: <470 mW (cladding pump laser: 200 mW, ASE source: 250 mW, Phase modulator driver: <20 mW).

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures.

What is claimed is:

1. A waveguide optical gyroscope (WOG) comprising:
   an amplified spontaneous emission (ASE) source;
   a sensor comprising a waveguide loop disposed in a first cladding material interposed between layers of at least a second cladding material having an index of refraction lower than an index of refraction of the first cladding material, wherein the sensor is configured to receive an output signal of the ASE source; and
   a pump source configured to pump the first cladding material with an in-plane pump signal relative to a plane of the WOG to facilitate optical gain in the waveguide loop,
   wherein the sensor comprises a trench formed along a transverse axis of the sensor and spaced from the pump source such that the waveguide loop is disposed between the pump source and the trench.

2. The WOG of claim 1, wherein the waveguide loop comprises a rare-earth (RE) doped silica.

3. The WOG of claim 1, wherein the ASE source comprises a second waveguide and a second pump source configured to energize the second waveguide.

4. The WOG of claim 3, wherein the second pump source of the ASE source comprises an athermal pump laser.

5. The WOG of claim 3, wherein the second waveguide comprises a rare-earth (RE) doped silica.

6. The WOG of claim 1, further comprising a reflective coating disposed in the trench.

7. The WOG of claim 6, wherein the reflective coating comprises metal.

8. The WOG of claim 1, wherein the pump source comprises an athermal pump laser.

9. A waveguide optical gyroscope comprising:
   an amplified spontaneous emission (ASE) source;
   a three-dimensional integrated Sagnac interferometer comprising a multilayer waveguide loop disposed in a first cladding material and interposed between layers of at least a second cladding material having an index of refraction lower than an index of refraction of the first cladding material, wherein a sensor is configured to receive an output signal of the ASE source; and
   a pump source configured to pump the first cladding material with an in-plane pump signal to facilitate compensation for propagation loss in the waveguide loop,
   wherein the three-dimensional integrated Sagnac interferometer comprises a trench formed along a transverse axis extending through one or more of the first cladding material and the layers of second cladding material, and
   wherein the trench is spaced from the pump source such that the waveguide loop is disposed between the pump source and the trench.

10. The WOG of claim 9, wherein the waveguide loop comprises a rare-earth (RE) doped silica.

11. The WOG of claim 9, wherein the ASE source comprises a second waveguide and a second pump source configured to energize the second waveguide.

12. The WOG of claim 11, wherein the second pump source of the ASE source comprises an athermal pump laser.

13. The WOG of claim 11, wherein the second waveguide comprises a rare-earth (RE) doped silica.

14. The WOG of claim 9, further comprising a reflective coating disposed in the trench.

15. The WOG of claim 14, wherein the reflective coating comprises metal.

16. The WOG of claim 9, wherein the pump source comprises an athermal pump laser.

17. A cladding pumped waveguide comprising:
a three-dimensional integrated Sagnac interferometer disposed on a silicon PLC, the three-dimensional integrated Sagnac interferometer comprising a multilayer waveguide loop disposed in a first cladding material and interposed between layers of at least a second cladding material having an index of refraction lower than an index of refraction of the first cladding material; and
a pump source disposed adjacent a center of the multilayer waveguide loop and configured to pump the first cladding material with an in-plane pump signal to facilitate compensation for propagation loss in the waveguide loop,
wherein the three-dimensional integrated Sagnac interferometer comprises a trench formed along a transverse axis extending through one or more of the first cladding material and the layers of second cladding material, and
wherein the trench is spaced from the pump source such that the waveguide loop is disposed between the pump source and the trench.

18. The cladding pumped waveguide of claim 17, wherein the pump source comprises an athermal pump laser.

\* \* \* \* \*